United States Patent [19]

D'Andrea et al.

[11] Patent Number: 5,347,871
[45] Date of Patent: Sep. 20, 1994

[54] STRAIN SENSOR

[75] Inventors: Louis A. D'Andrea, West Wareham; Roger W. Masson, Acushnet, both of Mass.

[73] Assignee: Teledyne Industries, Inc., Los Angeles, Calif.

[21] Appl. No.: 831,376

[22] Filed: Feb. 3, 1992

[51] Int. Cl.⁵ .............................................. G01B 7/16
[52] U.S. Cl. .................................................... 73/775
[58] Field of Search ................. 73/775, 776, 862.042, 73/862.49, 862.627, 862.338, 862.339, 855, 761

[56] References Cited

U.S. PATENT DOCUMENTS

| | | | |
|---|---|---|---|
| 4,246,780 | 1/1981 | Reed | 73/862.49 |
| 4,432,247 | 2/1984 | Takeno et al. | 73/776 X |
| 4,553,872 | 11/1985 | Chandra et al. | 73/855 |
| 4,656,875 | 4/1987 | Uitermarkt | 73/862.49 |
| 5,193,402 | 3/1993 | Reed | 73/862.627 X |

Primary Examiner—Robert Raevis

[57] ABSTRACT

A strain sensor adapted for adhesive attachment to a device element such as a valve stem includes a sensor circuit coupon, a support for the coupon, and a clamp carried by the support for clamping the support around the device element.

5 Claims, 4 Drawing Sheets

STRAIN SENSOR

FIELD OF THE INVENTION

This invention relates to providing for sensing strain, particularly through provision on devices such as valve stems of strain sensors after and while the devices are already out in the field.

BACKGROUND OF THE INVENTION

It is known to provide strain sensors on valve stems.

SUMMARY OF THE INVENTION

I have discovered that strain sensors of the character above mentioned may be suitably and desirably provided by a sensor coupon including a sensor circuit, the coupon being carried by a support adapted to be adhesively secured to a device.

In preferred embodiments, the sensor coupon includes an etched circuit encapsulated in a plastic (including both torque and thrust strain gauge circuits), the support is a thin sheet of stainless steel, and the support includes a pair of clamping blocks for drawing the support tightly about the device.

PREFERRED EMBODIMENT

The presently preferred embodiment is now described, in structure and operation, in the light of the drawings.

Drawings

STRUCTURE

Figure 1:
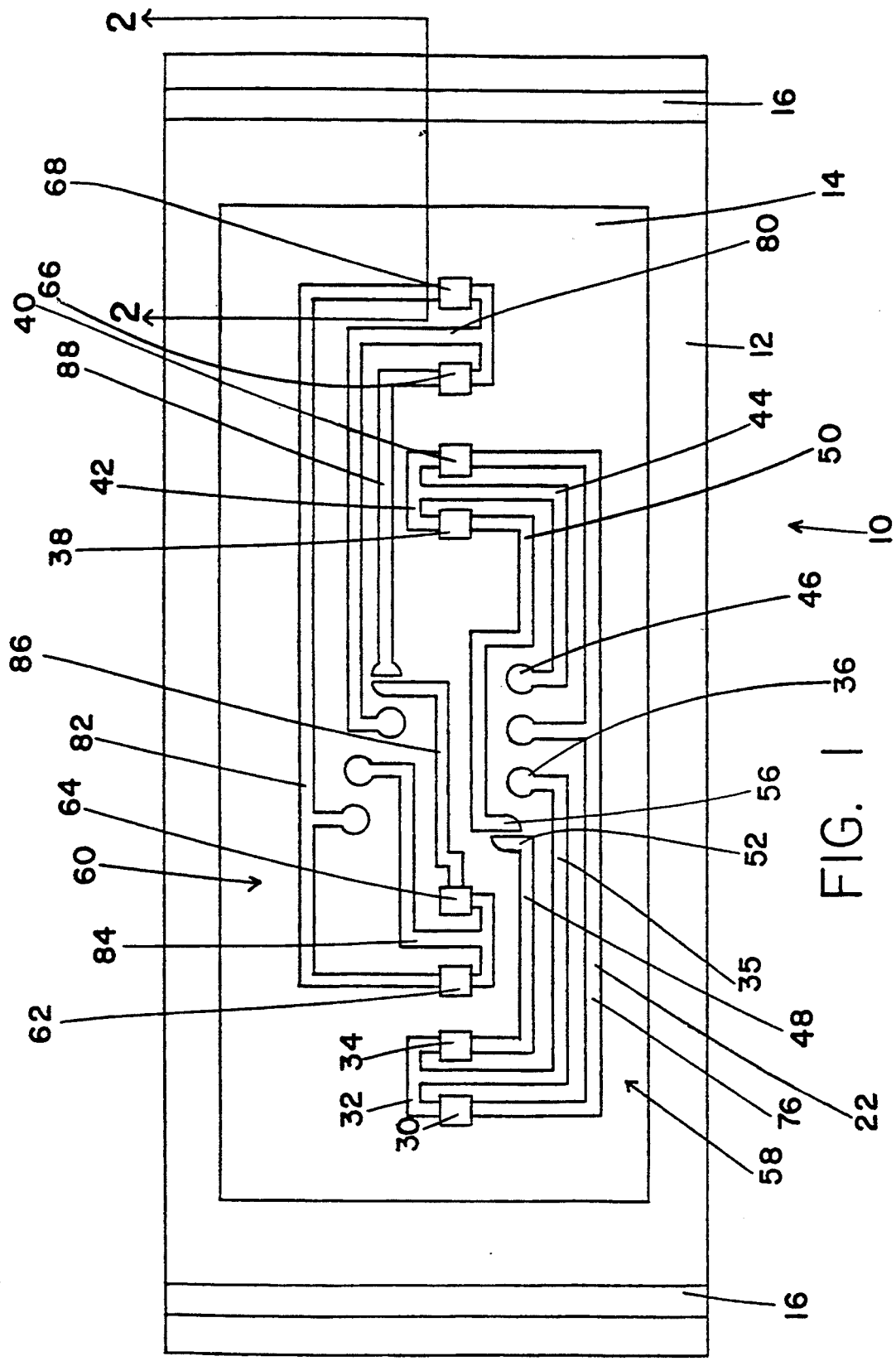
FIG. 1 is a plan view of said preferred embodiment, circuitry being shown in solid lines even though covered by a thin layer of plastic.
Figure 2:
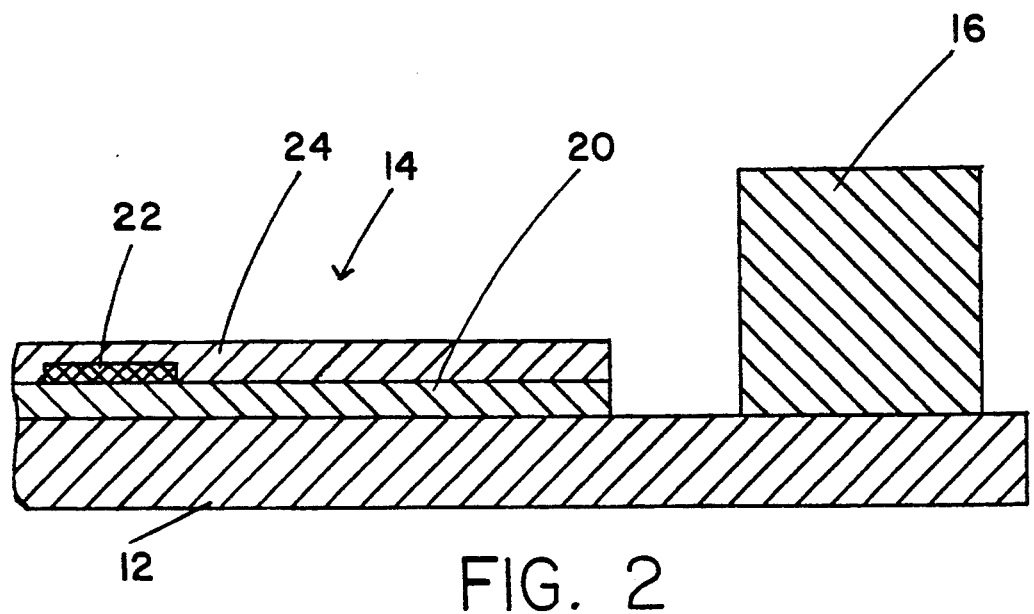
FIG. 2 is a sectional view, enlarged, diagrammatic, and not to scale, taken at 2—2 of FIG. 1.

There is shown in FIG. 1 a plan view of the preferred embodiment, which is indicated generally at 10. Shim stock 12, of stainless steel 0.003 inches thick, carries thereon coupon 14 and a pair of clamping blocks 16.

Clamping blocks 16 (of carbon steel) are spot-welded to shim stock 12.

Coupon 14 includes lower flexible polyimide portion 20, etched constantan circuitry 22, and flexible upper polyimide portion 24, the circuitry being sandwiched between the polyimide portions. Each polyimide portion is one mil thick. The constantan is 200 microinches in thickness.

In manufacture, a layer of constantan of the thickness indicated is attached onto lower portion 20. It is then etched to produce both the conductive conduits and pads and the strain gauges. The upper polyimide portion 24 is then overlain. Coupon structures of this character are available from J. P. Technologies, Upland, Calif.

The polyimide-encased coupon 14 is attached to shim stock 12 by means of a cured layer of epoxy adhesive sold under the designation BLH-DPY-500.

Turning now to the constantan circuit, there is shown in FIG. 1 torque bridge strain gauge 30, in which the resistance wires etched in the constantan are at an angle of 45°, upwardly rightwardly of FIG. 1. Connected thereto through connective path 32 is torque bridge strain gauge 34, with its resistance wires etched at a 45° angle upwardly leftwardly of FIG. 1. Connective path 32 connects also with connective path 35, which leads to pad 36. A third torque strain gauge 38 has its resistance "wires" like gauge 30 at an angle of 45° upwardly rightwardly of FIG. 1. The fourth torque strain gauge 40 has its resistance elements oriented as in gauge 34. Gauges 38 and 40 are connected by path 42, which also connects both with path 44 and pad 46. Gauges 34 and 38 are respectively connected through paths 48 and 50 to pads 52 and 56.

The circuitry just described is that for the torque strain gauge, and is indicated generally at 58.

Similar circuitry, indicated generally at 60, provides thrust strain gauge circuitry, to measure tension or compression. Circuitry 60 includes strain gauges 62, 64, 66, 68, resistance "wires" in them being oriented, in FIG. 1, respectively, vertical, horizontal, vertical, and horizontal.

Figure 5:
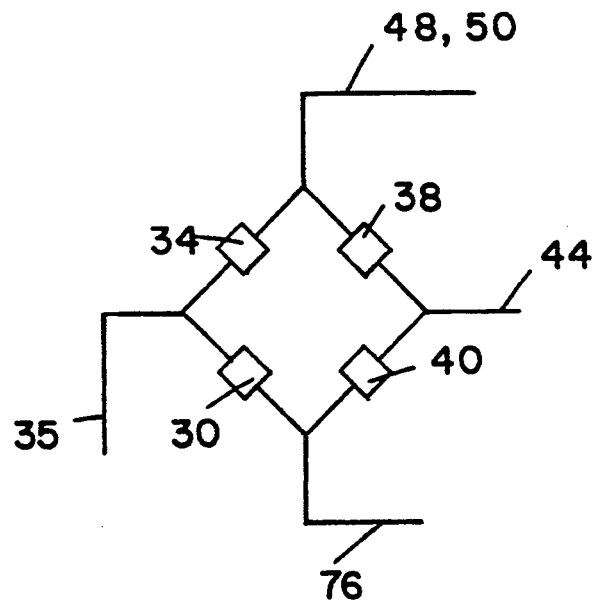
FIG. 5 is a circuit diagram of the torque bridge portion of the preferred embodiment.
Figure 6:
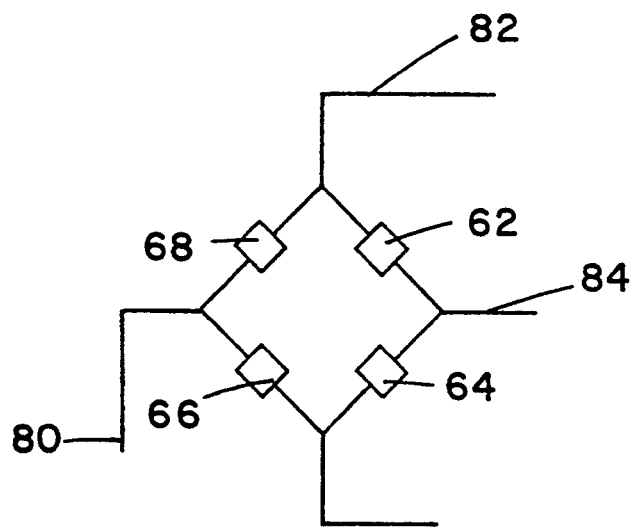
FIG. 6 is a circuit diagram of the thrust bridge portion of the preferred embodiment.

The circuitry is shown electrically in FIGS. 5 and 6.

FIG. 5 illustrates the torque strain gauge bridge. Excitation is through lines 35 (negative) and 44 (positive); the signal is on lines 48, 50 (positive) and 76 (negative). Wires to an outside connector (not shown) are soldered to the pads (e.g., pad 36) electrically connected with the strain gauges. Divided pads (such as 52, 56) leave the option of either shortcircuiting the gap between pads or wiring a resistor therebetween for adjustment in a way well known in the art.

FIG. 6 illustrates the thrust strain gauge.

Figure 3:
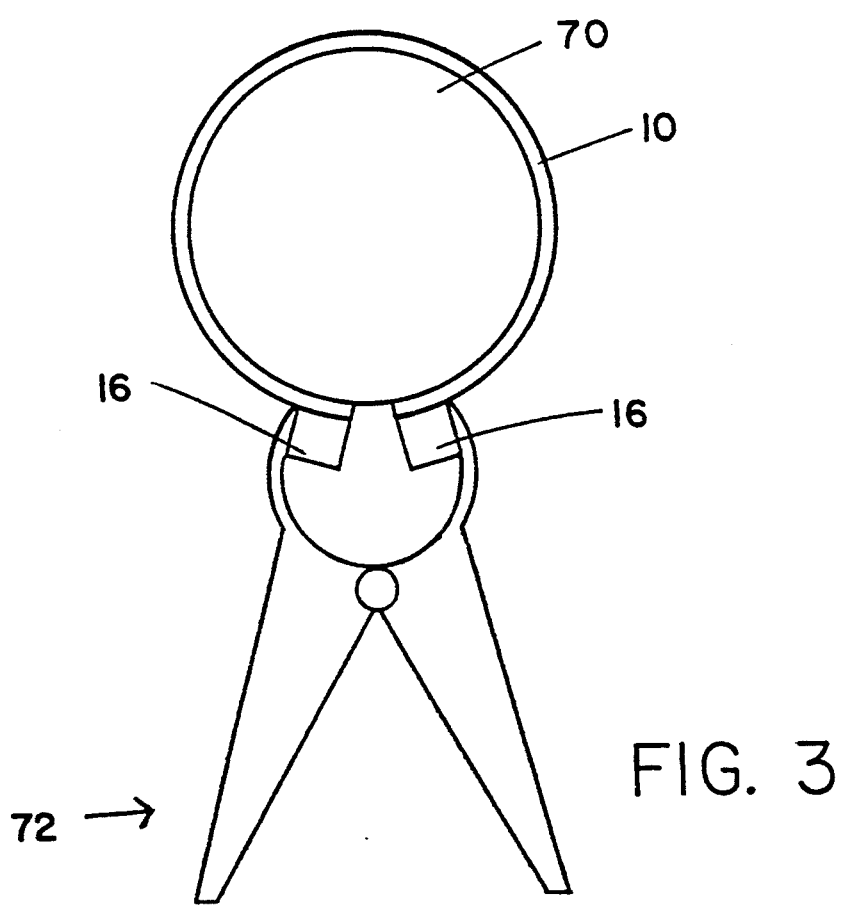
FIG. 3 is a side elevational view of said embodiment being clamped on a valve stem.
Figure 4:
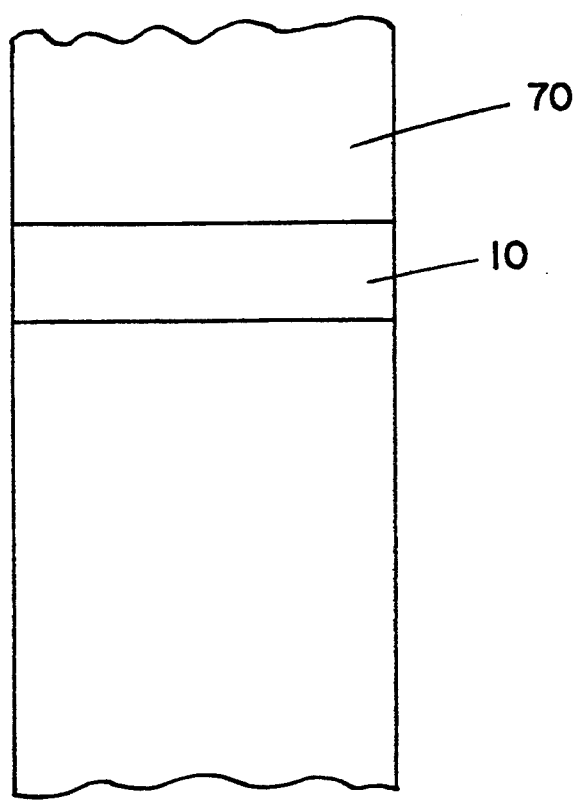
FIG. 4 is a view of said embodiment in position on said valve stem.

FIG. 3 illustrates the method of mounting sensor 10 on valve stem 70. Stem 70 is cleaned and abraded over the surface to be placed in contact with shim stock 12, the surface of which is also cleaned and abraded to provide improved adhesion. A layer of epoxy adhesive material (suitably that sold by Armstrong Products Co. of Warsaw, Ind. under the designation of A-2) is provided between said surfaces, and the sensor 10 then clamped around valve stem 70 by means of spring clamp 72. While clamp 72 is clamping sensor 10 around stem 70, the adhesive is cured, applying suitable heat for the purpose.

Blocks 16 may then be removed if desired, by means of a chisel or otherwise.

Use of the sensor of the invention permits very rapid installation in the field, something particularly desirable when in the presence of radiation.

I claim:

1. A strain sensor comprising
   a thin, flexible non-loadbearing support sheet, and
   a flexible strain gauge coupon mounted on said support sheet, said coupon comprising a strain gauge circuit embedded in a flexible insulating element, and said support carrying a pair of clamping means.

2. The sensor of claim 1 in which said support is shim stock.

3. The sensor of claim 2 in which said clamping means is spot welded to said shim stock.

4. The method of applying a strain gauge torque bridge circuit and a strain gauge thrust bridge circuit to a cylindrical stressable cylindrical base which comprises the steps of:

adhering on a flexible plastic layer a layer of etchable conductor, adhering over said flexible plastic layer and said etchable conductor a cover layer of flexible plastic, adhering the coupon produced by the steps thus far to a sheet of flexible support materials, applying a layer of adhesive material, and circumferentially and radially pulling said support material against said cylindrical base with said adhesive material therebetween, and rendering said adhesive material operatively adhesive.

5. The method of claim 4 which includes the steps of:

attaching to said coupon spaced protuberances, engaging said protuberances with tensioning means in carrying out said pulling step, and removing said protuberances.

* * * * *